Oct. 17, 1967  J. R. SCHILLER ETAL  3,346,964
GAGING DEVICE
Filed March 3, 1966  3 Sheets-Sheet 2

INVENTORS
James R. Schiller,
BY Eric M. Pohl, &
Albertus Smeitink

Barnard, McGlynn & Reising
ATTORNEYS

Oct. 17, 1967　　　J. R. SCHILLER ETAL　　　3,346,964
GAGING DEVICE

Filed March 3, 1966　　　　　　　　　　　　3 Sheets-Sheet 3

INVENTORS
James R. Schiller,
BY Eric M. Pohl, &
Albertus Smeitink

Barnard, McGlynn & Reising
ATTORNEYS

United States Patent Office 3,346,964
Patented Oct. 17, 1967

3,346,964
GAGING DEVICE
James R. Schiller, Grosse Pointe, Eric M. Pohl, Southfield, and Albertus Smeitink, East Detroit, Mich., assignors to Speedring Corporation, Warren, Mich., a corporation of Michigan
Filed Mar. 3, 1966, Ser. No. 531,588
30 Claims. (Cl. 33—147)

The present invention relates to a high precision device for dimensionally gaging workpieces.

It is an object of the present invention to provide a gaging device which is entirely mechanical in operation, greatly simplified over previous such devices and yet capable of extreme accuracy. The subject gage is uniquely conceived and constructed to permit measurements to an accuracy of one millionth of an inch.

It is also an object of the present invention to provide a gaging device which has a measuring range of internal dimensions of from ⅛ inch to 10 inches and for external dimensions of from 0 inches to 9½ inches.

The present gaging device includes a pair of workpiece engaging probes supported within a housing for substantially frictionless movement during gaging at the same time providing means to permit one of the probes to be moved through a considerable longitudinal range relative to the other preliminary to gaging to thereby releasably establish a basic distance between the workpiece contacting surfaces of said probes. After the basic or reference distance is established, the probes are longitudinally movable through a further limited distance relative to each other as said probes engage a workpiece to be measured.

It is also an object of the present invention to mount said gaging probes for vertical movement with respect to a workpiece supporting surface to position said probes in the proper vertical attitude for workpiece engagement and further to permit a vertical scanning of a workpiece surface to gage for cylindricity. The vertical movement of said probes is achieved by mounting the same on an extremely stable elevator member disposed within the gage housing and providing means to vertically adjust the elevator relative to said workpiece table.

It is a further object of the present invention to uniquely support said elevator member upon a pair of longitudinally spaced shaft members disposed on opposite sides thereof whereby one of said shaft members primarily provides vertical stability for said elevator and the other of said shafts primarily provides for the lateral stability thereof.

It is another object of the present invention to provide a probe supporting block substantially frictionlessly supported upon the elevator member for limited longitudinal movement relative thereto and a dial indicator fixed to the block for movement therewith.

It is also an object of the invention to support the other probe upon said elevator member through a supporting structure whereby said probe and said structure may move together substantially without friction longitudinally relative to said elevator member and further to provide means whereby said probe may be independently moved longitudinally relative to said elevator and said supporting structure.

It is a further object of the invention to provide a unique device for releasably locking said other probe against independent movement relative to said supporting structure.

The details as well as other objects and advantages of the present invention will be apparent from a perusal of the detailed description which follows.

Figure 1:
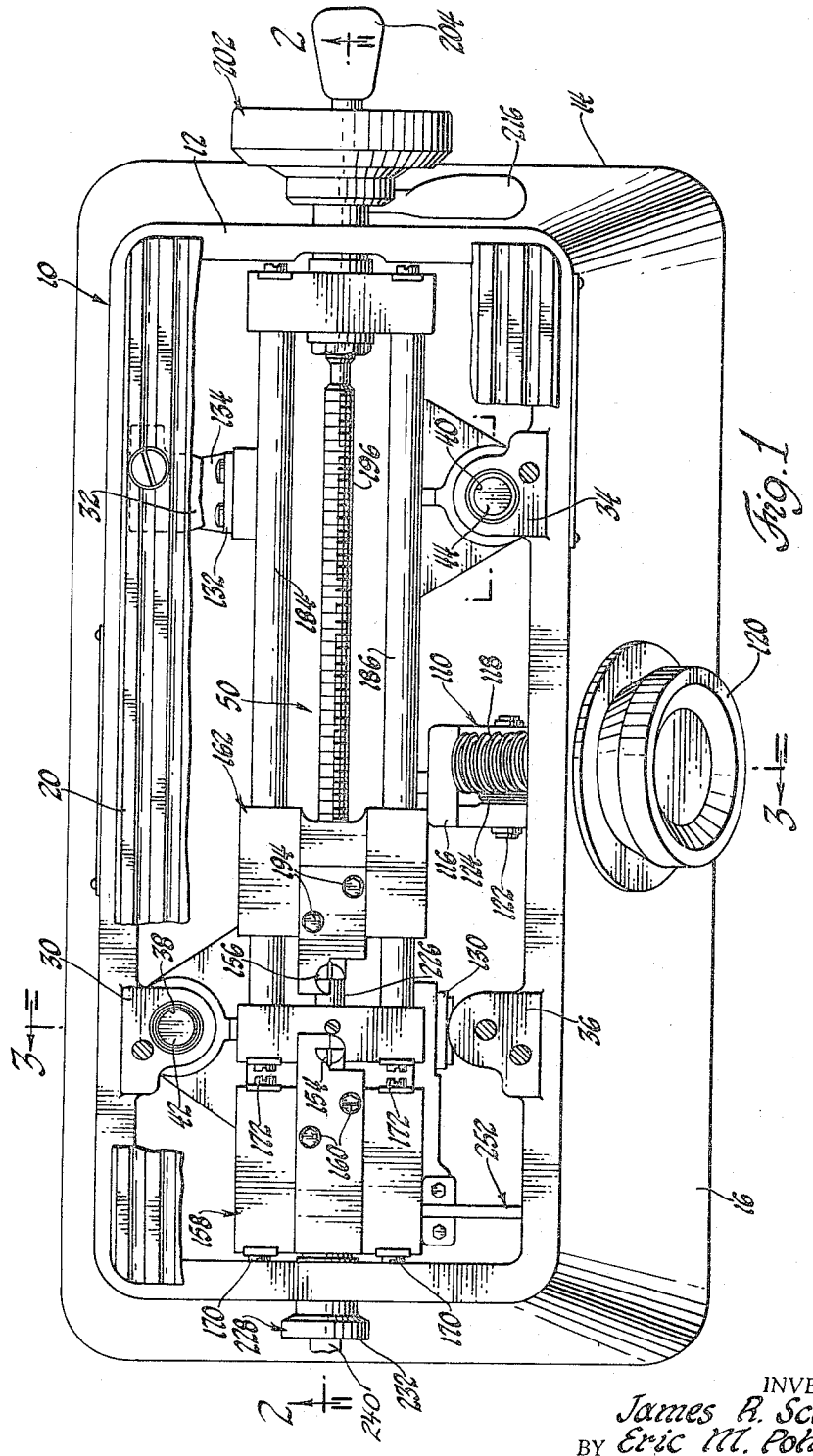
FIGURE 1 is a plan view of the gaging device with the workpiece supporting surface partially broken away to show the gage operating mechanism.

Prior to the development of the subject device, high precision gaging instruments have been complicated, bulky and hence costly. As a consequence, the use of such gages has been severely limited. The present invention was conceived with the objective in mind of developing a high precision measuring instrument which is more compact and significantly less expensive than devices of corresponding accuracy. With the advent of the present invention, it is believed that high precision gages will become common additions to shops and factories heretofore unwilling or unable to afford such instruments.

With respect to accuracy, cost, simplicity and compactness, the present invention represents a distinct improvement over prior gaging instruments such as the type shown in United States Patent 2,216,796. The goal of a relatively low price, high precision gaging device has been achieved by combining elements in a manner unique to the gaging industry.

Referring to the drawings, an elongated housing is indicated generally at 10. Housing 10 includes a rectangular upper section 12 and a lower rectangular section 14. The upper and lower housing sections 12 and 14 are joined by an inclined front face 16.

As illustrated, housing 10 is open at the upper and lower surfaces thereof being adapted to be enclosed at the lower opening by a bottom plate 18 and at the top by a workpiece supporting table or surface 20. Bottom plate 18 is secured to the lower section of the housing through suitable fastening means such as screw members 22 adapted to be threaded into screw receiving housing bosses 24.

Likewise, workpiece supporting table or surface 20 includes a plurality of holes 26 suitably recessed to receive machine screws 28 adapted to be threaded into housing 10.

While the preferred form of the invention is shown, it is to be understood that housing 10 may be so formed as to provide a workpiece supporting surface as an integral part thereof rather than with the removable table 20.

The upper edge of housing 10 includes inwardly extending bosses 30, 32, 34 and 36. Bosses 30 and 34 include vertical holes 38 and 40 formed therethrough and which holes are adapted to respectively receive and support one end of shafts 42 and 44. Shafts 42 and 44 have close tolerance fits within boss holes 38 and 40 and boss holes 38 and 40 include locking washers 46 to prevent downward movement of the shafts. Table 20 abuts the upper ends of shafts 42 and 44 to prevent any upward movement thereof. The lower ends of shafts 42 and 44 are unsupported.

An elongated elevator member 50 comprises a generally flat rectangular central section 52 having rigidifying rib portions 54 extending along each edge thereof and extending throughout a major portion of the length of said member. Said rib portions 54 having a reduced taper from the center toward the ends. A first elongated boss 56 is formed on one side of member 50 and includes a bore 58 extending perpendicularly to the plane of flat section 52.

A second boss 60 is formed on the opposite side of member 50 and also includes a bore 62 extending perpendicularly to elevator section 52.

Figure 2:
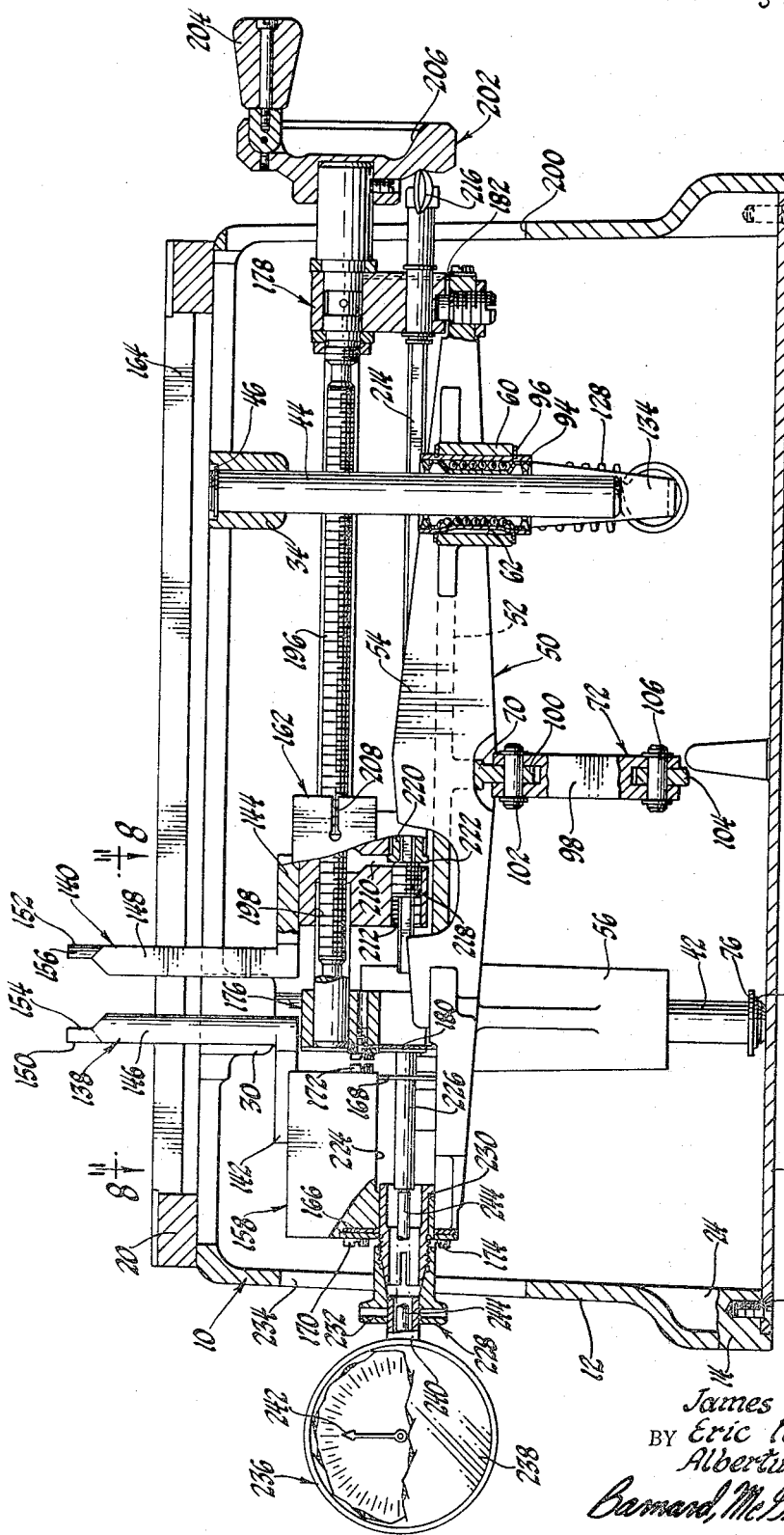
FIGURE 2 is a sectional view along line 2—2 of FIGURE 1.

As is particularly apparent in FIGURE 2, elongated boss 56 is substantially longer than boss 60. The purpose of making boss 56 substantially longer than boss 60 is that the former is designed to withstand essentially all of the vertical load of elevator 50. Thus, the vertical stability of elevator 50 is maintained by the coaction of boss 56 and shaft 42. In other words, any tendency of elevator 50 to pivot in a vertical plane is prevented by a close tolerance fit between boss 56 and shaft 42. On the other hand, short boss 60 coacts with shaft 44 to prevent any tendency of elevator 50 to pivot in a horizontal plane thus providing lateral stability.

Since the vertical load of elevator 50 is much greater than lateral loading, boss 56 must be a larger member than boss 60. Furthermore, since bore 62 of boss 60 is relatively short it is much easier to assure the parallelism of the bore with that of bore 58 of boss 56 than would be the case if the bores were of the same long length.

Elevator member 50 also includes a central transversely extending web portion 70 projecting below the bottom surface of flat section 52. As will subsequently be considered in greater detail, web portion 70 is adapted to be interconnected with an elevator actuating mechanism indicated generally at 72.

Elevator member 50 is slidably supported on shafts 42 and 44 which respectively extend through the bores of bosses 56 and 60. The lower end of shaft 42 includes a stop member 74 upon which a nylon or other suitable cushioning washer 76 is supported. Washer 76 is adapted to be engaged by the lower end of elongated boss 56 to limit the downward travel of elevator 50. Similarly, a resilient washer 78 surrounds shaft 42 and is mounted upon the upper end of boss 56 to cushion the upward engagement of elevator 50 with housing boss 30. Since shaft 42 and boss 56 provide the vertical movement limiting means, including washers 76 and 78, for elevator member 50 it is unnecessary to provide such features with respect to short shaft and boss 44 and 60.

Figure 3:
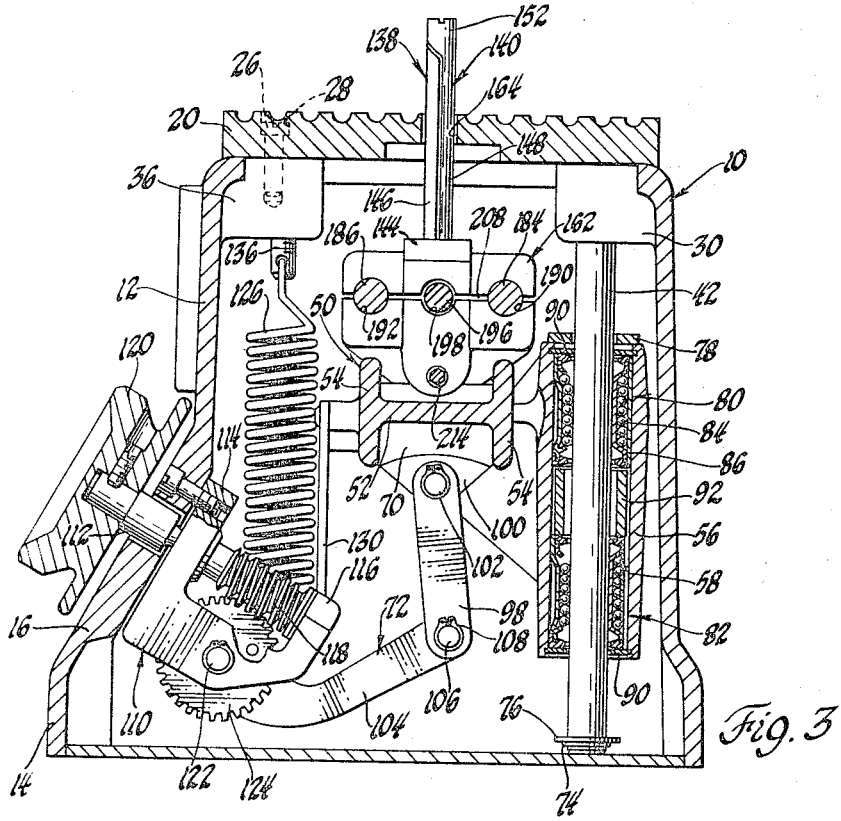
FIGURE 3 is a sectional view along line 3—3 of FIGURE 1.
Figures 4, 5:
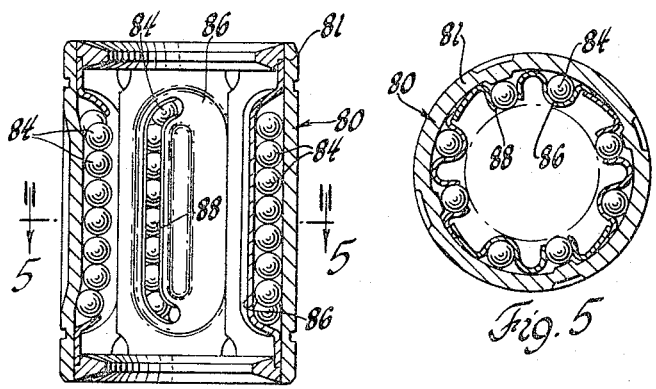
FIGURE 4 is an enlarged view of one elevator bearing device.
FIGURE 5 is a view along line 5—5 of FIGURE 4.

Except as hereinafter distinguished, the anti-friction means disposed within elevator bosses 56 and 60 are similarly constructed and arranged. Accordingly, reference is made to FIGURE 3 which includes a sectional view through elongated boss 56. Bore 58 of boss 56 is made of sufficient diameter to receive anti-friction means, which in this case are roller bearing devices 80 and 82. A detail view of device 80 is shown in FIGURE 4 and all of such devices as shown in the drawings are identical.

Device 80 includes a housing 81 for a plurality of sets 84 of ball bearings retained in oval tracks 86 having slotted vertical openings 88 formed therein. Approximately one-half of the balls of each bearing sets 84 are exposed through slotted openings 88. As elevator 50 moves vertically the ball bearings engage with shaft 42 causing the balls to roll and traverse within the tracks 86. As a result of such bearing arrangement there is substantially zero tolerance between the bearings and shaft 42.

Bearing devices 80 and 82 are tightly fitted within bore 58 and retained therewithin by suitable lock washers 90.

A cylindrical member 92 is loosely disposed between bearing devices 80 and 82 to maintain the latter in a spaced relation within bore 58. Spacer member 92 includes an enlarged bore whereby any contact with shaft 42 is avoided.

A similar bearing device or cartridge 94 is disposed within bore 62 of short elevator boss 60 and is retained therewithin by lock washers 96.

Thus, since shafts 42 and 44 have substantially zero clearance with the coacting bearing devices 80–82 and 94, elevator 50 is supported upon housing 10 without vertical or transverse looseness. Being able to so mount the elevator contributes importantly to the great accuracy of the gaging device.

As already noted, an elevator actuating mechanism is indicated generally at 72 and is centrally positioned relative to the long dimension of housing 10 and also with respect to the longitudinal dimension of elevator member 50. By thus centrally locating elevator actuator mechanism 72, the vertical load thereon is substantially balanced.

Elevator actuating mechanism 72 includes a first link member 98 transversely slotted at its upper and lower ends. Cross bores extend at right angles through said slotted portions. The upper slotted portion of link 98 is adapted to receive a tongue 100 formed on elevator web 70 and which tongue also includes a hole formed therethrough. A pin 102 articulates link 98 to the elevator member through tongue 100. One end of a bell crank lever 104 similarly extends within the lower slot in link 98 and is articulated thereto by a pin 106. Pins 102 and 106 are retained in position through suitable locking washers 108. A U-shaped bracket member 110 is suitably fixed to the inside face of tapered front housing wall 16. Inclined housing wall 16 includes a hole through which extends a shaft member 112 rotatably supported within bracket legs 114 and 116. Shaft 112 has a worm gear section 118 formed thereon. Shaft 112 has a knob 120 secured thereto exteriorly of housing 10.

Bracket 110 supports a shaft member 122 which extends perpendicularly to worm gear shaft 112. Shaft 122 rotatably supports the other end of bell crank lever 104 thereon. A gear member 124 is fixed to said other end of bell crank lever 104 and meshes with worm gear member 118. Thus, as knob 120 is rotated, worm gear member 118 rotates bell crank lever 104 to raise or lower elevator 50.

Inasmuch as elevator member 50 and the members, infra, supported thereon are reasonably heavy, approximately twelve pounds, and in order to prevent such a load from being entirely imposed on elevator actuator mechanism 72, counterbalancing coil springs 126 and 128 are provided.

Brackets 130 and 132 are secured to elevator member 50 and extend downwardly on opposite sides thereof terminating in outwardly extending arms 134. One end of each coil spring 126 and 128 is respectively secured to bracket arm 134 while the other end is secured to the bottom side side of bosses 36 and 32 through suitable retained pins 136.

As elevator 50 is lowered on shafts 42 and 44, springs 126 and 128 are extended or placed under tension. When knob 120 is rotated to raise the elevator, the raising effort is supplemented by the tensioned springs.

*Gaging probes*

Gaging probes are indicated generally at 138 and 140. The probes are generally of the same construction. Probes 138 and 140 include base members 142 and 144 from which an arm or stylus 146 and 148 extends vertically upwardly. The upper end of each stylus includes a workpiece engaging member 150 and 152 preferably formed of a hardened material such as tungsten carbide.

Figure 6:
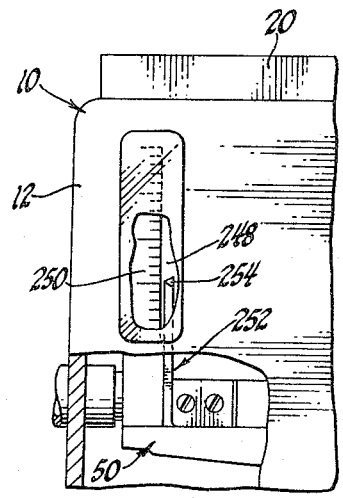
FIGURE 6 is a fragmentary view showing the device for indicating the vertical position of the gaging probes.

In order to permit the probes to be capable of measuring as small a workpiece internal diameter (I.D.) as possible, the styluses 146 and 148 have a compound cross sectional shape. As best seen in FIGURES 1 and 6, each stylus is hemispherical in cross section from the bottom to just below the portions 154 and 156 which contain workpiece engaging members 150 and 152. Stylus portions 154 and 156 are also hemispherical in cross section but are turned 90° to the subadjacent hemispherical portions.

In this way the probes 146 and 148 may be moved toward each other into a nesting relationship to minimize the distance between workpiece engaging members 150 and 152. This nesting relationship permits the probes to measure very small internal diameters.

Probe 146 is removably supported on a block member 158 through screw members 160 so as to inwardly overhang the block member. Probe 158 is similarly supported upon a block member 162.

The purpose of thus removably mounting the probes is so that different sets of probes may be utilized to vary the size range of parts which may be measured. To illustrate with the standard probes as shown, the internal diameter range for measuring workpieces is from ⅜ of an inch to 6 inches. By utilizing accessory probe sets a minimum internal diameter of ⅛ of an inch and a maximum internal diameter of 10 inches may be measured. Thus, the I.D. measuring range of the gage is from ⅛″ to 10″.

Workpiece supporting surface or table 20 includes a longitudinally extending slot 164 formed therethrough. As seen in FIGURE 2, slot 164 extends substantially throughout the length of table 20. Probes 138 and 140 project through slot 164 so that workpiece engaging members 150 and 152 are disposed above the workpiece supporting surface.

In order to support block member 158 and thus probe 138 for substantially frictionless gaging movement, two pairs of transversely spaced flat or reed springs 166 and 168 are secured to the end faces of the block member through suitable screw means 170 and 172. Similar screw means 174 secure the lower ends of reed springs 166 and 168 to elevator member 50.

By thus mounting block member 158 upon reed springs 166 and 168, the block may move substantially frictionlessly for a limited distance in either direction from its neutral position with such movement being parallel to table slot 164.

Additional block members 176 and 178 are supported upon elevator member 50 through pairs of transversely spaced reed springs 180 and 182. Block members 176 and 178 are interconnected through rods 184 and 186 so that the block members and rods move in unison relative to elevator member 50.

The fourth block member 162 includes a pair of longitudinal openings 190 and 192 which receive rods 184 and 186 to slidably support the block member upon the rods. Probe 140 is removably mounted upon block member 162 through screws 194. Probe base 144 inwardly overhangs block member 162 to permit nesting of styluses 146 and 148, supra.

A threaded screw shaft 196 is rotatably supported proximate its ends in block members 176 and 178. The screw shaft 196 is dissposed intermediate rods 184 and 186 and is parallel thereto. An internally threaded central opening 198 is formed through block member 162 and threadably receives screw shaft 196. The end of shaft 196 proximate block member 178 extends through a vertically elongated slot 200 in housing 10 and has a knob 202 suitably fixed thereto.

Knob 202 has a pivoted handle 204 secured thereto and which handle may be recessed within depressed portion 206 of the knob. Handle 204 may be extended, as shown in FIGURES 1 and 2, to permit fast rotation of shaft 196. When handle 204 is recessed, knob 202 is actuated to more slowly rotate shaft 196 during final adjustment.

Since the gaging device must be capable of accommodating various size workpieces, it is necessary to set, through suitable gaging blocks, the basic distance between the workpiece engaging elements 150 and 152 of the probes 138 and 140. To adjust the probes for the size workpiece to be gaged, knob 202 is rotated, fast or slow, supra, to vary the position of probe 140 within slot 164. Once the basic distance between probes 138 and 140 is set it is necessary to lock probe 140 against further movement relative to rods 184 and 186.

Locking device

Figures 7, 8:
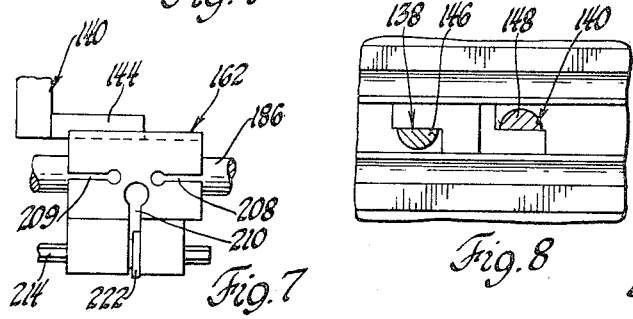
FIGURE 7 is a view of the probe clamping mechanism.
FIGURE 8 is a view along line 8—8 of FIGURE 2.

As best seen in FIGURE 7, adjustable probe supporting block member 162 includes first and second transversely extending horizontal slots 208 and 209 which symmetrically intersect rod openings 190 and 192. Slots 208 and 209 are open at their outer ends. A third transversely extending vertical slot 210 is formed in block member 162 and is open at its bottom end.

A central opening is formed through the lower portion of block member 162 and includes a threaded portion 212. One end of a shaft 214 having a polygonal cross section extends through the lower central opening in block member 162. The other end of shaft 214 is round and is rotatably supported in block member 178 and has a lever 216 fixed thereto and disposed exteriorly of housing 10.

A threaded member 218 is fixed for rotation with shaft 214 and engages threaded portion 212 of the lower central opening in block member 162. A sleeve member 220 is loosely mounted on shaft 214 and includes a flange 222 abutted by threaded member 218. Sleeve flange 222 projects within vertical slot 210 in member 162.

Thus, as lever 216 is moved downwardly threaded member 218 moves toward sleeve member 200, to the right as viewed in FIGURE 2, causing flange 222 to engage the block member within slot 210. This engagement causes a counterclockwise movement or deformation of that portion of the block member between slots 208 and 210 and a clockwise movement of that portion between slots 209 and 210. Such movement deforms rod openings 190 and 192 thereby clamping the block member 162 to rods 184 and 186 locking the block member against further movement relative to the rods.

Indicator

The lower portion of block member 158 includes an opening 224 parallel to table slot 164. A rod element 226 is fixed to block member 176 and projects within block opening 224.

A collet device 228 includes a sleeve member 230 fixed within block opening 224. Sleeve member 230 includes a threaded and slotted end extending beyond the block member and receives an internally threaded and tapered collar 232. Collar 232 extends outwardly through vertical housing slot 234.

An indicator 236 includes a dial housing 238 and an elongated casing 240. Casing 240 projects within and is secured to block member 158 by collet device 228.

Indicator 236 includes a conventional indicator hand or arrow 242 and a suitable actuating mechanism. The only part of the indicator actuating mechanism shown is a plunger 244 which is suitably biased for abutting engagement with element 226.

Thus, indicator 236 and plunger 244 are mounted for movement, through block member 158, with probe 138. Element 226 is mounted for movement, through block member 176, rods 184 and 186, and block member 162, with probe 140.

Gaging operation

Once the predetermined distance is set between the probes 138 and 140, supra, the device is ready to gage workpieces. Assuming it is desired to measure the I.D. of a workpiece, it is to be understood that the probes have been positioned by reference to gaging blocks so that the probes are slightly biased toward each other, through the supporting reed springs 166, 180 and 182, to achieve a "zero" setting on indicator 236. Thus, if a workpiece is oversized, the reed springs will tend to return to an unstressed position giving an appropriate reading on the indicator dial.

Depending on the depth or thickness of the workpiece dimension being measured, the vertical position of workpiece engaging elements 150 and 152 is adjusted by actuating mechanism 72 to raise or lower elevator 50. A workpiece is next placed over probes 138 and 140 and supported on table 20. Assuming one of the probes moves relative to the other, plunger 244 must move axially relative to block member opening 224. Since the indicator housing 238 and casing 240 are fixed to block member 158, the relative movement of plunger 244 will cause arrow 242 to move from the "zero" setting.

As best seen in FIGURE 6, a vertical opening or slot 248 is formed through the front wall of upper housing section 12. A vertical scale 250 is mounted on wall 12 proximate slot 248. A bracket arm 252 is fixed to elevator 50 and extends upwardly and forwardly terminating in a pointer 254 disposed within slot 248. Scale 250 is adapted to indicate the height of workpiece engaging elements 150 and 152 above the workpiece supporting surface of table 20. Thus, by use of the scale and pointer 254 the operator can set the height of the probes at which gaging is to be done. This is particularly useful when a blind or hole closed at one end is to be gaged.

It is also to be appreciated that if probes 138 and 140 are moved equally in the same direction there will be no movement of the indicator arrow 242 from the "zero" setting. For example, if element 226 and plunger 244 were moved 1/32 of an inch to the left, there would be no relative movement of the plunger relative to block member 158, and, thus, no change of reading by arrow 242.

It should also be appreciated that the subject gaging device may be utilized to check a workpiece surface for cylindricity or perpendicularity with respect to another surface. This function may be achieved by raising and lowering elevator 50 whereby probe elements 150 and 152 vertically scan the workpiece surface.

While a preferred embodiment of the subject invention has been shown and described, it is apparent that modifications thereof may be made within the intended scope of the hereinafter appended claims.

The embodiments of the invention in which an exclusive property or privilege is claimed are defined as follows:

1. A gaging device comprising a housing, said housing including a workpiece supporting surface having an elongated slot therethrough, an elevator member disposed within said housing, means for vertically raising and lowering said elevator member, a first workpiece engaging probe extending through said slot, means for traversing said first probe throughout a substantial part of the length of said slot, a device for rendering inoperative said traversing means, means for supporting said first probe upon said elevator member for limited longitudinal movement within said slot independently of said traversing means, a second workpiece engaging probe extending through said slot, means supporting said second probe upon said elevator for limited longitudinal movement within said elongated slot, an indicator secured to said second probe supporting means and movable with said second probe, a member extending from said first probe supporting means and operatively engaging said indicator to actuate said indicator whenever said traversing means is inoperative and one of said probes moves relative to the other.

2. A gaging device comprising a housing, said housing including a workpiece supporting surface having an elongated slot therethrough, an elevator member disposed within said housing, means for vertically raising and lowering said elevator member, a first workpiece engaging probe extending through said slot, means for traversing said first probe throughout a substantial part of the length of said slot, a device for rendering inoperative said traversing means, means for supporting said first probe upon said elevator member for limited longitudinal movement within said slot independently of said traversing means, a second workpiece engaging probe extending through said slot, means supporting said second probe upon said elevator for limited longitudinal movement within said elongated slot, an indicator secured to said second probe supporting means and movable with said second probe, said indicator including a plunger element, a member fixed to said first probe supporting means and abuttingly engaging said plunger element, said plunger element being adapted to actuate said indicator whenever said traversing means is inoperative and one of said probes moves relative to the other.

3. A gaging device as set forth in claim 1 wherein said elevator comprises an elongated member generally coextensive with the length of said slot, first and second bosses disposed at generally opposite ends of said elongated member, said bosses including vertical openings therethrough, friction reducing means disposed within each of said boss openings, a pair of shafts respectively fixed at one end to said housing and extending through said boss openings to slidably support said elevator thereupon.

4. A gaging device as set forth in claim 1 wherein said elevator comprises an elongated member generally coextensive with the length of said slot, first and second bosses disposed at generally opposite ends of said elongated member, said bosses including vertical openings therethrough, friction reducing means disposed within each of said boss openings, a pair of shafts respectively fixed at one end to said housing and extending through said boss openings to slidably support said elevator thereupon, said elevator raising and lowering means being mounted on said housing and articulated to said elongated member intermediate said bosses.

5. A gaging device as set forth in claim 3 wherein said friction reducing means comprises roller bearings.

6. A gaging device as set forth in claim 3 wherein said first boss is substantially longer than said second boss and primarily provides vertical stability for said elongated member, said shorter second boss primarily providing horizontal stability for said elongated member.

7. A gaging device as set forth in claim 3 wherein said first and second bosses are disposed on opposite sides of the longitudinal axis of said elongated member.

8. A gaging device as set forth in claim 7 wherein the elevator raising and lowering means includes a pair of spring members secured between said housing and said elongated member, said spring members being respectively connected to said elongated member opposite said first and second bosses.

9. A gaging device as set forth in claim 8 wherein said elongated member includes a pair of depending arms respectively disposed opposite said first and second bosses, one end of each spring member being respectively secured to said depending arms.

10. A gaging device as set forth in claim 1 wherein said indicator is removably fixed to said second probe supporting means, said indicator including a dial disposed exteriorly of said housing, an indicator actuator being slidably supported within said second probe supporting means, and means biasing said actuator into engagement with the member extending from said first probe supporting means.

11. A gaging device as set forth in claim 10 in which said indicator actuator and said member extending from said first probe supporting means are axially aligned within said housing.

12. A gaging device as set forth in claim 1 wherein the elevator raising and lowering means includes spring means disposed between said housing and said elevator and biasing said elevator toward said workpiece support surface.

13. A gaging device comprising a housing, said housing including a workpiece supporting surface having an elongated slot formed therethrough, a pair of vertically extending longitudinally spaced shafts supported at one end upon said housing, an elongated elevator member slidably supported upon said shafts, said elevator member being generally longitudinally coextensive with said slot, means for raising and lowering said elevator member within said housing, a first block member, reed spring means supporting said first block member upon the elevator member for substantially frictionless movement generally parallel to said slot, a second block member, reed spring means supporting said second block member upon said elevator member for frictional movement generally parallel to said slot, a third block member, reed spring member supporting said third block member upon said elevator member for substantially frictionless movement generally parallel to said lot, rod mean interconnecting said second and third block members whereby said second and third block members and said rod means move in unison, a fourth block member slidably mounted on said rod means, means for traversing said fourth block member along said rod means to vary the longitudinal position of said fourth block member relative to said slot, means for deforming said fourth block member to releasably lock the latter member against movement along said rod means, a first workpiece engaging probe supported upon said first block member for movement therewith, a second workpiece engaging probe supported upon said fourth block member for movement therewith, said first and second probes extending through said slot and terminating above said workpiece supporting surface, and an indicator supported upon said first block member for movement therewith.

14. A gaging device comprising a housing, said housing including a workpiece supporting surface having an elongated longitudinal slot formed therethrough, a pair of vertically extending longitudinally spaced shafts supported at one end upon said housing, an elongated elevator member slidably supported upon said shafts, said elevator member being generally longitudinally coextensive with said slot, means for raising and lowering said elevator member within said housing, a first block member, reed spring means supporting said first block member upon the elevator member for substantially frictionless movement generally parallel to said slot, a second block member, reed spring means supporting said second block member upon said elevator member for frictional movement generally parallel to said slot, a third block member, reed spring member supporting said third block member upon said elevator member for substantially frictionless movement generally parallel to said slot, rod means interconnecting said second and third block members whereby said second and third block members and said rod means move in unison, a fourth block member slidably mounted on said rod means, means for traversing said fourth block member along said rod means to vary the longitudinal position of said fourth block member relative to said slot, means for deforming said fourth block member to releasably lock the latter member against movement along said rod means, a first workpiece engaging probe supported upon said first block member for movement therewith, a second workpiece engaging probe supported upon said fourth block member for movement therewith, said first and second probes extending through said slot and terminating above said workpiece supporting surface, an indicator supported upon said first block member for movement therewith, said indicator including a plunger disposed within said housing and generally parallel to said slot, an element extending from said second block in axial alignment with said plunger, and means biasing said plunger and said elements into abutting contact within said housing.

15. A gaging device as set forth in claim 13 wherein said fourth block member includes a pair of spaced longitudinal openings formed therethrough and through which openings said rod means extend to slidably support said fourth block member.

16. A gaging device as set forth in claim 13 wherein said fourth block member includes a pair of spaced longitudinal openings formed therethrough and through which openings said rod means extend to slidably support said fourth block member, said fourth block member including a plurality of slots suitably formed therein proximate said longitudinal openings to render the block member deformable adjacent said rod means.

17. A gaging device as set forth in claim 16 wherein said fourth block deforming means comprises a shaft rotatably supported at one end in said third block member, the other end of said shaft being rotatably supported within said fourth block member, means associated with said other end of said shaft and the fourth block member whereby rotation of said shaft in one direction will cause the slotted portions of the block to deform and clamp the block to said rod means.

18. A gaging device as set forth in claim 17 wherein the plurality of slots includes a vertically extending slot formed transversely of the longitudinal openings in the fourth block member, the means associated with said other end of said shaft coacting with the block member proximate the transversely formed slot to impart deforming movement to said block upon rotation of said shaft in one direction.

19. A gaging device as set forth in claim 18 wherein said fourth block member includes an opening formed therethrough and rotatably supporting said other end of said shaft, said transversely formed slot communicating with said shaft opening, the shaft opening in said fourth block member including a threaded portion, a threaded member mounted for rotation with said shaft and rotatably engaging the threaded portion of the shaft opening, a sleeve mounted upon said shaft and including a flange extending within the said transversely formed slot, said threaded member abutting said sleeve whereby rotation of said shaft in one direction actuates said threaded member and said sleeve to deform said fourth block member.

20. A gaging device as set forth in claim 19 wherein the plurality of slots includes a pair of horizontally disposed slots formed transversely of and extending through said longitudinal openings, the inner ends of said pair of slots terminating proximate said vertically extending slot, and the outer ends of said pair of slots being open.

21. A housing, said housing including a workpiece supporting surface having an elongated slot formed therethrough and extending through the length of said surface, a pair of vertically extending longitudinally spaced shafts supported at one end upon said housing, an elongated elevator member slidably supported upon said shafts, said elevator member being generally longitudinally coextensive with said slot, means for raising and lowering said elevator member within said housing, a first block member, reed spring means supporting said first block member upon the elevator member for substantially frictionless movement generally parallel to said slot, a second block member, reed spring means supporting said second block member upon said elevator member for frictional movement generally parallel to said slot, a third block member, reed spring member supporting said third block member upon said elevator member for substantially frictionless movement generally parallel to said slot, rod means interconnecting said second and third block members whereby said second and third block members and said rod means move in unison, a fourth block member slidably mounted on said rod means, a screw shaft rotatably supported in said second and third block members, a threaded opening through the fourth block member threadably receiving said screw shaft, said screw shaft extending through said housing and having a knob secured thereto to rotate said screw shaft and move said fourth block member along said rod means to vary the longitudinal position of said fourth block member relative to said slot, means for deforming said fourth block member to releasably lock the latter member against movement along said rod means, a first workpiece engaging probe supported upon said first block member for movement therewith, a second workpiece engaging probe supported upon said fourth block member for movement therewith, said first and second probes extending through said slot and terminating above said workpiece supporting surface, an indicator supported upon said first block member for movement therewith.

22. A gaging device comprising a housing, said housing including a workpiece supporting surface having an elongated slot therethrough, an elevator disposed within said housing, means for vertically raising and lowering said elevator, a first workpiece engaging probe means including a portion thereof extending through said slot, means for traversing said first probe means throughout a substantial part of the length of said slot, a device for rendering inoperative said traversing means, means for supporting said first probe means upon said elevator for limited longitudinal movement within said table slot independently of said traversing means, a second workpiece engaging probe means including a portion thereof extending through said slot, means supporting said second probe means upon said elevator for limited longitudinal movement within said elongated slot, an indicator supported upon said elevator and movable with said second probe means, an element movable with said first probe means and operatively engaging said indicator, said element being adapted to actuate said indicator whenever said traversing means is inoperative and one of said probe means moves relative to the other.

23. A gaging device comprising a housing, said housing including a workpiece supporting surface for an elongated slot therethrough, an elevator disposed within said housing, means for vertically raising and lowering said elevator, a first probe means including a stylus extending through said slot, means for traversing said first probe means through a substantial part of the length of said slot, a device for rendering inoperative said traversing means, said first probe means being supported substantially frictionlessly upon said elevator for limited longitudinal movement within said table slot independently of said traversing means, a second probe means including a stylus extending through said slot, said second probe means being supported substantially frictionlessly upon said elevator for limited longitudinal movement within said elongated slot, an indicator means supported upon said elevator and movable with said second probe means, an element movable with said first probe means and operatively engaging said indicator means, said element being adapted to actuate the indicator means whenever said traversing means is rendered inoperative and one of said probes moves relative to the other.

24. A gaging device comprising a housing, said housing including a workpiece supporting surface for an elongated slot therethrough, an elevator disposed within said housing, means for vertically raising and lowering said elevator, a first probe means including a stylus extending through said slot, means for traversing said first probe means through a substantial part of the length of said slot, a device for rendering inoperative said traversing means, said first probe means being supported substantially frictionlessly upon said elevator for limited longitudinal movement within said table slot independently of said traversing means, a second probe means including a stylus extending through said slot, said second probe means being supported substantially frictionlessly upon said elevator for limited longitudinal movement within said elongated slot, an indicator means supported upon said elevator and movable with said second probe means, an element movable with said first probe means and operatively engaging said indicator means, said element being adapted to actuate the indicator means whenever said traversing means is rendered inoperative and one of said probes moves relative to the other, said housing including a vertical slot extending therethrough, a scale disposed on said housing proximate said vertical slot, and a pointer member fixed to said elevator and including an end extending within said vertical slot to indicate the vertical position of said styluses relative to said workpiece supporting surface.

25. A gaging device as set forth in claim 24 and including a collet means mounted upon said elevator and fixed for movement with said second probe means, said collet means being adapted to removably support said indicator means upon said elevator.

26. A gaging device as set forth in claim 25 wherein said indicator means comprises a dial housing, a movable pointer member disposed within said dial housing, an elongated casing supporting said dial housing and extending within said collet means, and a motion transmitting mechanism adapted to operatively connect said pointer member and the element movable with said first probe means.

27. a gaging device as set forth in claim 26 wherein said dial housing is disposed exteriorly of the gaging device housing and said elongated casing extends within the gaging device housing.

28. A gaging device as set forth in claim 27 wherein said elongated casing includes a longitudinal axis disposed parallel to the elongated slot in said workpiece supporting surface.

29. A gaging device comprising a housing, said housing including a workpiece supporting surface having an elongated slot formed therethrough, a plurality of bosses formed on said housing proximate said workpiece supporting surface and on opposite sides of the elongated slot, a first shaft dependingly supported at one end from a first of said bosses, a second shaft longitudinally spaced from said first shaft and dependingly supported from a second of said bosses, an elongated elevator member being slidably supported upon said first and second shafts, means for raising and lowering said elevator member on said shafts, means biasing said elevator member toward said workpiece supporting surface, a first probe means including a stylus extending through said slot, means for traversing said first probe means through a substantial part of the length of said slot, a device for rendering inoperative said traversing means, said first probe means being supported substantially frictionlessly upon said elevator for limited longitudinal movement within said table slot independently of said traversing means, a second probe means including a stylus extending through said slot, said second probe means being supported substantially frictionlessly upon said elevator for limited longitudinal movement within said elongated slot, an indicator means supported upon said elevator and movable with said second probe means, an element movable with said first probe means and operatively engaging said indicator means, said element being adapted to actuate the indicator means whenever said traversing means is rendered inoperative and one of said probe means moves relative to the other.

30. A housing having an open upper end, a workpiece supporting table fixed to said housing and enclosing the upper end thereof, said table including a longitudinal slot formed therethrough and extending substantially throughout the length thereof, an elevator disposed within said housing, means for vertically raising and lowering said elevator, a first probe extending through said slot, means for traversing said first probe throughout a substantial part of the length of said table slot, a device for rendering inoperative said traversing means for supporting said first probe upon said elevator for limited longitudinal movement within said table slot independently of said traversing means, a second probe extending through said slot, means supporting said second probe upon said elevator for limited longitudinal movement within said table support, said first and second probes including a horizontally aligned workpiece engaging element disposed above said table, an indicator secured to said second probe supporting means and movable with said second probe, said indicator including a plunger element operable by said first probe during the independent and limited movement thereof.

No references cited.

SAMUEL S. MATTHEWS, *Primary Examiner.*